US010402217B2

(12) United States Patent
Shanley et al.

(10) Patent No.: US 10,402,217 B2
(45) Date of Patent: Sep. 3, 2019

(54) AUTOMATIC RECONFIGURATION OF A PRE-CONFIGURED HYPER-CONVERGED COMPUTING DEVICE

(71) Applicant: VMware, Inc., Palo Alto, CA (US)

(72) Inventors: Dave Shanley, Fremont, CA (US); Mornay Van Der Walt, Los Gatos, CA (US); Wit Riewrangboonya, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 360 days.

(21) Appl. No.: 14/279,094

(22) Filed: May 15, 2014

(65) Prior Publication Data
US 2015/0331693 A1 Nov. 19, 2015

(51) Int. Cl.
G06F 9/44 (2018.01)
G06F 9/455 (2018.01)
G06F 9/4401 (2018.01)
G06F 8/61 (2018.01)
G06F 9/50 (2006.01)
G06F 11/30 (2006.01)

(52) U.S. Cl.
CPC ............ *G06F 9/45558* (2013.01); *G06F 8/63* (2013.01); *G06F 9/4401* (2013.01); *G06F 9/4405* (2013.01); *G06F 9/45533* (2013.01); *G06F 9/5072* (2013.01); *G06F 11/30* (2013.01); *G06F 2009/45562* (2013.01); *G06F 2009/45591* (2013.01); *G06F 2009/45595* (2013.01)

(58) Field of Classification Search
CPC .................................................... G06F 9/4401
See application file for complete search history.

(56) References Cited

U.S. PATENT DOCUMENTS

| 7,213,246 | B1* | 5/2007 | van Rietschote | G06F 11/1482 707/999.202 |
|---|---|---|---|---|
| 7,461,130 | B1* | 12/2008 | AbdelAziz | H04W 84/20 709/208 |
| 8,464,092 | B1* | 6/2013 | Gentes | G06F 11/1438 709/245 |
| 2005/0207105 | A1* | 9/2005 | Davies | G06F 11/2028 361/679.4 |
| 2007/0078982 | A1* | 4/2007 | Aidun | G06F 11/2025 709/225 |
| 2009/0067431 | A1* | 3/2009 | Huang | H04L 49/90 370/394 |
| 2012/0011297 | A1* | 1/2012 | Shanbhag | H04L 49/356 710/316 |

(Continued)

*Primary Examiner* — Nicholas R Taylor
*Assistant Examiner* — Sanjoy Roy

(57) ABSTRACT

In a computer-implemented method for automatic reconfiguration of a computing device for supporting a virtualization infrastructure, wherein the computing device comprises independent server nodes, upon initialization of the computing device, functioning independent server nodes of the independent server nodes self-register with one another, wherein one of the independent server nodes is a default primary independent server node comprising virtualization infrastructure management software. In response to the default primary independent server node not self-registering with the functioning independent server nodes, one of the functioning independent server nodes is automatically reconfigured as a new primary independent server node.

9 Claims, 11 Drawing Sheets

(56) References Cited

U.S. PATENT DOCUMENTS

| | | | | |
|---|---|---|---|---|
| 2012/0179798 A1* | 7/2012 | Pafumi | ............... | G06F 9/5072 |
| | | | | 709/223 |
| 2014/0372595 A1* | 12/2014 | Ashok | ............... | H04L 67/1002 |
| | | | | 709/224 |
| 2015/0082016 A1* | 3/2015 | Bonczkowski | ..... | G06F 9/44505 |
| | | | | 713/100 |
| 2015/0091909 A1* | 4/2015 | Ajwani | ............... | G06T 11/206 |
| | | | | 345/440 |

* cited by examiner

900

```
upon initialization of the computing device, self-register functioning
independent server nodes of the independent server nodes with one
another, wherein one of the independent server nodes is a default primary
independent server node comprising virtualization infrastructure
management software
910
```

↓

```
in response to the default primary independent server node not self-
registering with the functioning independent server nodes, automatically
reconfigure one of the functioning independent server nodes as a new
primary independent server node
920 deploy the virtualization infrastructure management software at the
  new primary independent server node
  922
```

```
store an image of the virtualization infrastructure management software at
each of the independent server nodes
930
```

```
automatically recognize the reconfigured one of the functioning
independent server nodes as the new primary independent server node
940
```

```
receive instructions, at the new primary independent server node, from a
user, for configuring the computing device via the new primary
independent server node
950
```

FIG. 9

1100 access a plurality of independent server nodes of the pre-configured hyper-converged computing device for supporting a virtualization infrastructure, wherein the independent server nodes are configured from a first configuration to a second configuration
1110

in response to user input, reset the plurality of independent server nodes such that they are reconfigured from the second configuration to the first configuration
1120

FIG. 11

AUTOMATIC RECONFIGURATION OF A PRE-CONFIGURED HYPER-CONVERGED COMPUTING DEVICE

BACKGROUND

A computing device, for various reasons, may incur hardware failure. Accordingly, the computing device may not be able to function at all or may function with limited capabilities due to the hardware failure. As a result, the computing device is unable to provide expected services and functionality.

Moreover, even if the failed hardware is able to be fixed such that the computing device is operable, the hardware is typically required to be manually fixed and/or reconfigured.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 9 depicts a flow diagram for a method for automatic reconfiguration of a computing device for supporting a virtualization infrastructure, according to various embodiments.

FIG. 11 depicts a flow diagram for a method for resetting a pre-configured hyper-converged computing device for supporting a virtualization infrastructure, according to various embodiments.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Embodiments of a Virtual Computing Environment

Figure 1:
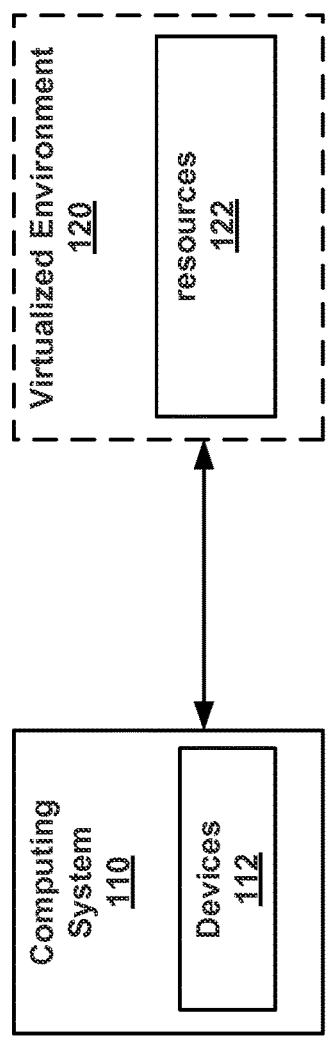
FIG. 1 depicts a block diagram of a virtual computing environment, according to various embodiments.

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines include a variety of operating systems and applications (e.g., word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ or ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
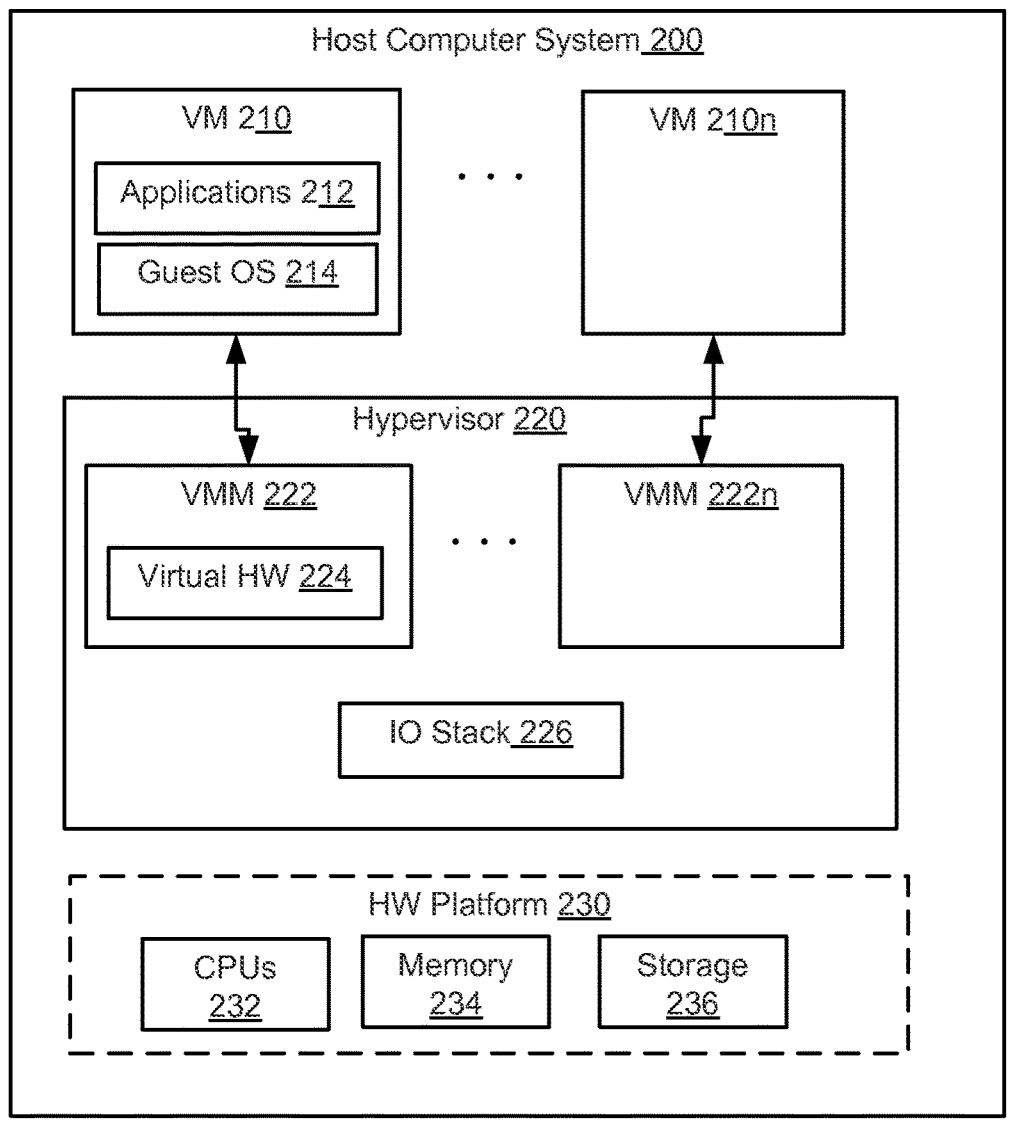
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. IOs issued by guest OS 214 through the native file system layer appear to guest OS 214 as being routed to one or more virtual disks provisioned for virtual machine 210 for final execution, but such IOs, in reality, are reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

The various embodiments described herein may be practiced with other computer system configurations including hand-held devices, microprocessor systems, microprocessor-based or programmable consumer electronics, minicomputers, mainframe computers, and the like.

Examples of an Appliance

Figure 3:
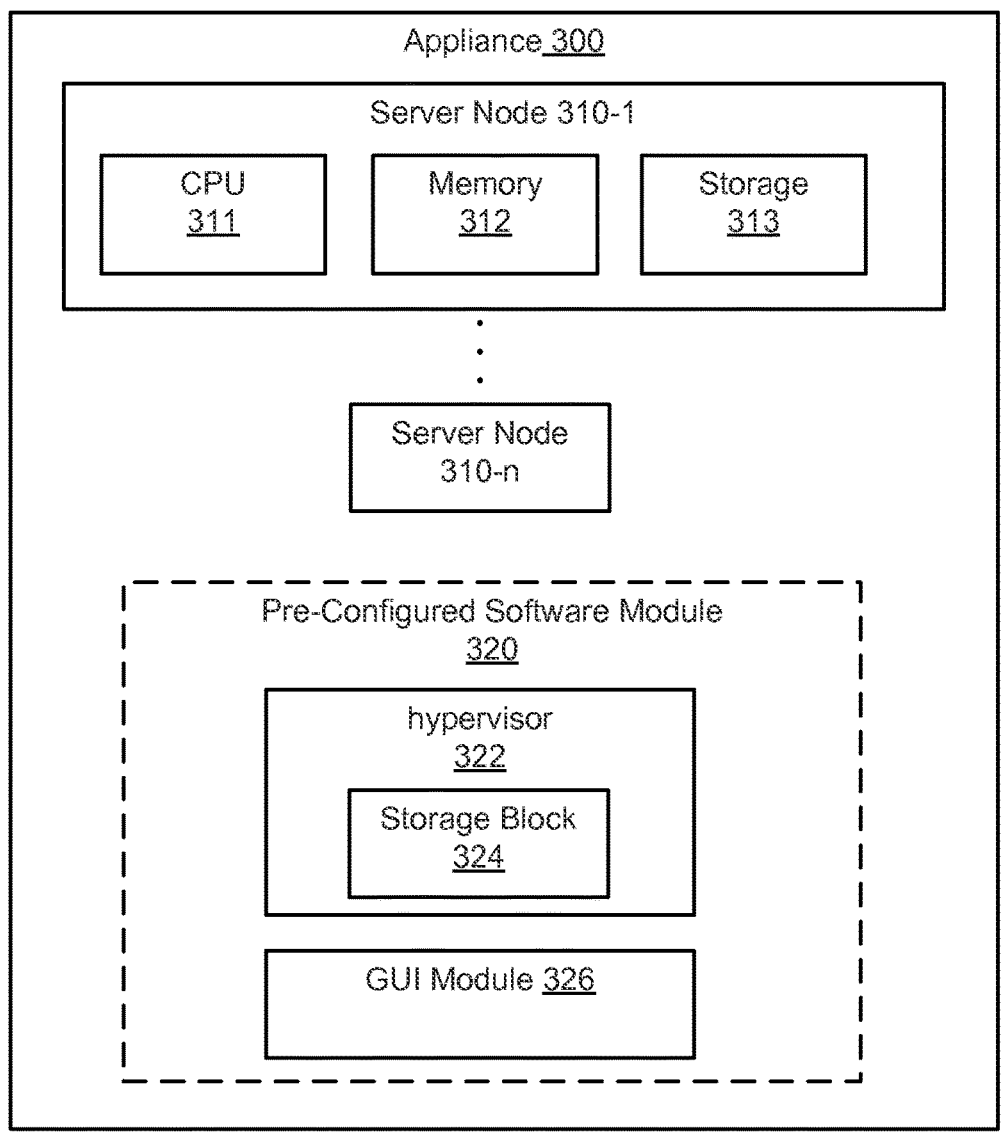
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-n. Server node 310-1 includes a central processing unit (CPU) 311, memory 312, and storage 313. It should be appreciated that other server nodes (i.e., server node 310-n) each include a CPU, memory, and storage similar to server node 310-n.

Appliance 300 supports a scale out architecture. Each appliance includes four server nodes. Multiple appliances can be scaled out to support the addition of more sever nodes—in increments of four server nodes per appliance.

In one embodiment, appliance 300 is able to deploy a plurality of virtual machines in the virtualization infrastructure. For example, based on the hardware and software incorporated in appliance 300, appliance 300 is able to deploy a number of virtual machines (e.g., up to 75 virtual machines, up to 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, four drive slots per server node. Such as a solid state drive (SSD) for read/write cache (e.g., an SSD up to 400 GB), and three hard disk drives (HDD) for the storage of virtual machines (e.g., HDDs up to 1.2 terabytes (TB) for a total of 3.6 TB).

Additionally, the appliance may include various external interfaces, such as but not limited to, serial, network RJ-45 or SPF+ (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-*n***).

The size of a piece of rack-mounted equipment is described as a number in "U" or "RU" (rack unit). One rack unit is often referred to as "1 U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes 4 server nodes (e.g., server nodes 310-1 through 310-*n***).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software to support virtualized computing (e.g., VMware vSphere™, VCenter™) that utilizes various components such as a VMware ESX/ESXi hypervisor.

Software module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Examples of Virtualization Infrastructures

Figure 4:
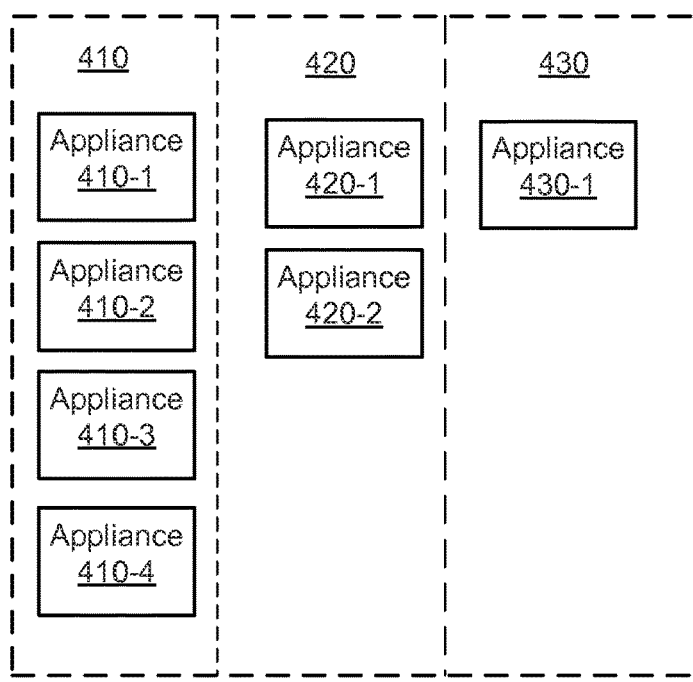
FIG. 4 depicts a block diagram of a virtualization infrastructure, according to various embodiments.

FIG. 4 depicts an embodiment of various appliances supporting virtualization infrastructure 400.

In one embodiment, appliances may be grouped together to increase the functionality of creating and managing a virtualization infrastructure. For example, appliance 410-1 was initially utilized to deploy a plurality of virtual machines, at location 410. However, additional virtual machines were desired but appliance 410-1, alone, was not able to meet the demand for the desired additional virtual machines. As such, additional appliances 410-2, 410-3, and 410-4 were purchased and grouped together to meet the demand of the additional virtual machines. In particular, the cluster or grouping of appliances which are communicatively coupled together, act as a single platform for managing the virtualization infrastructure and deploying virtual machines.

Similarly, appliance 420-1 was initially utilized to deploy a plurality of virtual machines, at location 420. However, additional virtual machines were desired but appliance 420-1, alone, was not able to meet the demand for the desired additional virtual machines. As such, additional appliance 420-2 was purchased and grouped together with appliance 420-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 400 is a virtualization infrastructure of a large enterprise having various building and infrastructure at various geo-locations. In such an example, information technology (IT) is located at a first location (e.g., location 410), an engineering team is located at a second location (e.g., location 420) and sales team is located at location 430.

Accordingly, appliances 410-1 through 410-4 may be grouped together at a first location 410 to support the demand for virtual machines of the IT team, appliances 410-1 and 410-2 are grouped together at location 420 to support the demand of virtual machines for the engineering team, and appliance 430-1 is located at location 430 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Embodiments of Auto-Discovery of Appliances in a Network

Figure 5:
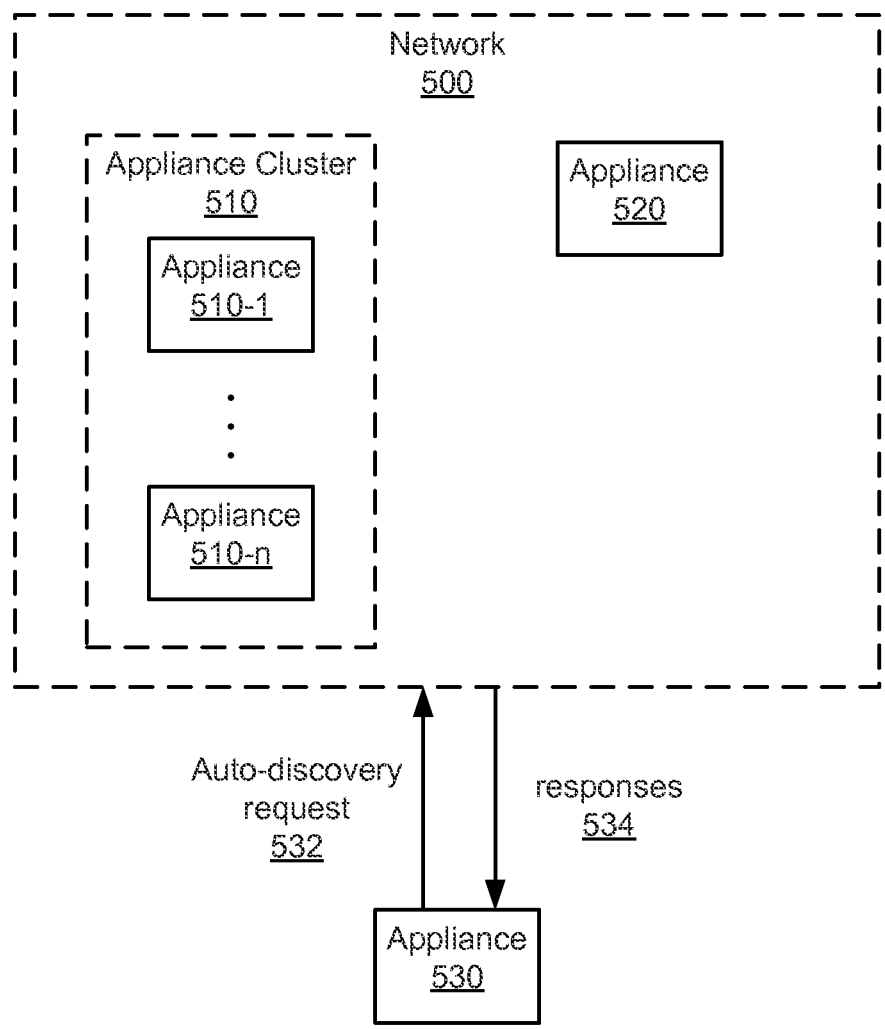
FIG. 5 depicts a block diagram of a virtualization infrastructure, according to various embodiments.

FIG. 5 depicts an embodiment of network 500 (or virtualization infrastructure).

Network 500 may include one or more appliances. For example, network 500 may include various appliances that are grouped together in a cluster and/or stand-alone.

Network 500, in one embodiment, includes appliance cluster 510 that includes appliances 510-1 through 510-n. Appliances 510-1 through 510-n are communicatively coupled and act as a single platform for managing the virtualization infrastructure and deploying virtual machines.

Additionally, network 500 may include stand-alone appliances such as appliance 520. Appliance 520 is independent to other clusters and other stand-alone appliances.

It is noted that appliances in network 500 (stand-alone appliances and/or clustered appliances) are authenticated and configured to function within network 500.

It may be desired that additional appliances are added to network 500 either as a stand-alone appliance or part of an existing appliance cluster to increase the functionality of the virtualization infrastructure. Moreover, the auto-discovery of other appliances that are authenticated and configured for use in the network is beneficial to the overall management of the appliances and network.

Referring still to FIG. 5, appliance 530 is intended to be added to network 500. Appliance 530 is initially communicatively coupled to network 500 (prior to being authenticated and configured to be included in network 500).

Appliance 530 automatically broadcasts an auto-discovery request 532 over network 500 to appliances within network 500 (e.g., appliances 510-1 through 510-n and appliance 520). The auto-discovery request by appliance 530 is provided by, but is not limited to, multicast Domain Name System (MDNS) broadcasting, or Domain Name System-Service Discovery (DNS-SD).

Appliance 530 may broadcast auto-discovery request 532 at various times during operation. For example, auto-discovery request 532 may be broadcasted upon initial powering on of appliance 530, during initial operation of appliance 530, or when appliance 530 is initially communicatively coupled to network 600 (but not authenticated or configured to operate within network 500. It should be appreciated that the auto-discovery request may be broadcasted upon initialization (or warm reset) of appliance 530.

Auto-discovery request 532 includes a service type. For example, request 532 includes a request for devices (or appliances) that are pre-configured hyper-converged computing devices. In one embodiment, the service type in request 532 is the same as the service type of appliance 530 (e.g., pre-configured hyper-converged computing device).

As will be described in further detail below, appliances have a unique identifier. The unique identifier includes the service type of the particular appliance. As such, in one embodiment, auto-discovery request 532 includes a portion of the unique identifier of the appliance.

Appliances within network 500 provide responses 534 to auto-discovery request 532 by appliance 530. Appliances in network 500 that receive the auto-discovery request may be required to respond to the auto-discovery request. In particular, the appliances having the same service type as the service type in auto-discovery request 532 provide responses 534.

If a stand-alone appliance, such as appliance 520, in network 500 receives the auto-discovery request then the stand-alone appliance provides a response. If appliances in a cluster receive the auto-discovery request, then one or more appliances in the cluster provide a response indicating that they are in a cluster of appliances.

Responses 534 are accessed by appliance 530 and indicate the appliances that are authenticated and configured to operate in network 500.

In one embodiment, responses 534 are obtained and displayed for viewing by a user, such as an IT administrator for network 500. The user may then select for appliance 530 to join a cluster, such as cluster 510, or join network 500 as a stand-alone appliance.

In another embodiment, appliance 530 may automatically decide to join a cluster, such as cluster 510, or join network 600 as a stand-alone appliance. The automatic decision may be based on which appliances in network 500 that are most similar to appliance 530.

Examples of an Appliance and Server Nodes with Unique Identifiers

A virtualization infrastructure, such as a datacenter, includes numerous hardware devices (e.g., appliances, routers, etc.). As a result, it is burdensome for administrators of the virtualization infrastructure to manage all of the components of the virtualization infrastructure. For example, if a server node of an appliance has a failure or error, it is very difficult to determine the location of the appliance in the virtualization infrastructure and which of the server nodes in the appliance has an error.

As will be described in further detail below, unique identifiers of a server node are correlated with a location of the server nodes in the appliance to facilitate in determining the exact location of the server nodes in the appliance.

Figure 6:
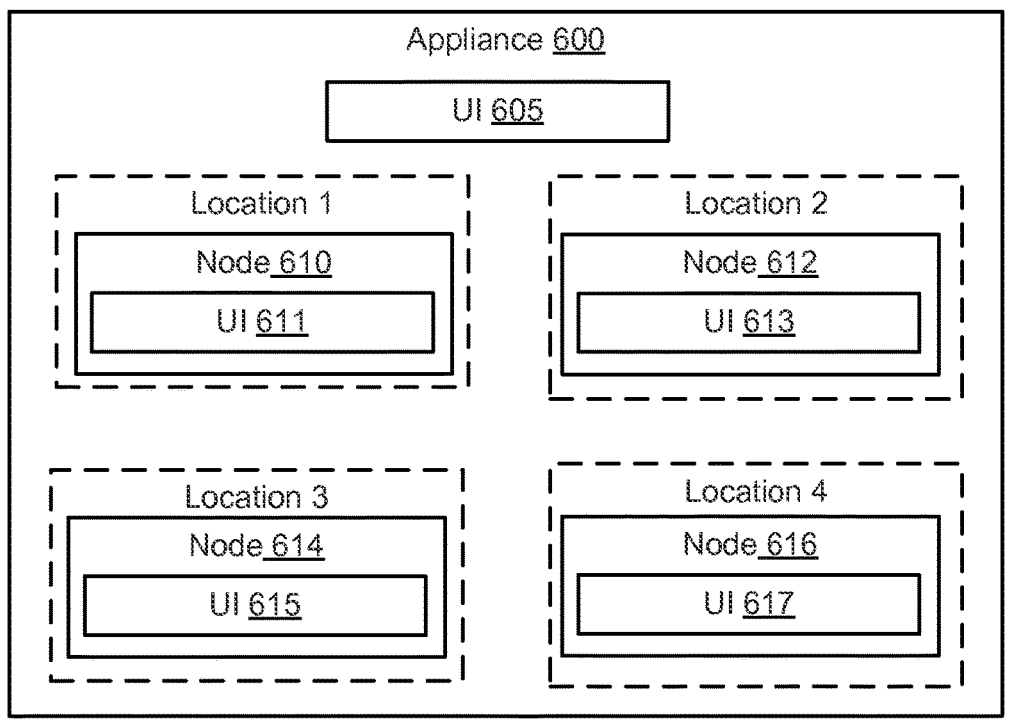
FIG. 6 depicts a block diagram of an appliance, according to various embodiments.

FIG. 6 depicts an embodiment of a block diagram of appliance 600. The block diagram can be a front view or a back view of appliance 600.

Appliance 600 is a four node appliance. Accordingly, appliance 600 includes independent server node 610, independent server node 612, independent server node 614, and independent server node 616. It should be appreciated that, in various embodiments, appliance 600 can include less than four nodes or more than four nodes.

Appliance 600 includes unique identifier 605. Unique identifier 605 is any identifier that is unique to appliance 600.

Additionally, each server node includes a unique identifier. For example, independent server node 610 includes unique identifier 611, independent server node 612 includes unique identifier 613, independent server node 614 includes unique identifier 615, and independent server node 616 includes unique identifier 617. Unique identifiers of the server nodes are any identifier that are unique their respective independent server node.

Unique identifier 605 can include any information associated with the appliance 600 such as, but not limited to, manufacturing code, distribution code, supplier code, version, service type, and random information (e.g., random alphanumeric number).

Likewise, the unique identifier for each server node can include any information associated with the respective server node, such as, but not limited to, manufacturing code, distribution code, supplier code, version, service type, and random information (e.g., random alphanumeric number).

In one embodiment, unique identifier 605 includes information associated with server nodes that are a part of the appliance, such as, the unique identifiers of each server node.

Appliance 600 includes pre-defined locations for placement of independent server nodes. For example, appliance 600 includes location 1, location 2, location 3, and location 4. The designated locations correspond to the slots in which independent server nodes are disposed in appliance 600 and are communicatively coupled with appliance 600.

For example, independent server node 610 is located at location 1, independent server node 612 is located at location 2, independent server node 614 is located at location 3, and independent server node 616 is located at location 4.

In one embodiment, the locations are sequential. For example, location 1 through location 4.

In another embodiment, the locations are sequential in a pre-defined pattern. For example, the locations are sequentially numbered in a "Z" pattern. In particular, the pattern of locations 1 through 4 form a "Z" pattern, where location 1 is at the left side of the upper row, location 2 is at the right side of the upper row, location 3 is at the left of the lower row, and location 4 is at the right of the lower row. It should be appreciated that sequence of locations 1 through 4 may provide a different pattern.

The unique identifier for each node is correlated with the location or position of the server node. For example, unique identifier 611 of server node 610 is correlated/associated with location 1, unique identifier 613 of server node 612 is correlated/associated with location 2, unique identifier 615 of server node 614 is correlated/associated with location 3, and unique identifier 617 of server node 616 is correlated/associated with location 4.

Based on the correlation, as described above, the exact location of the server node within the appliance is readily determined.

For instance, it is indicated that a server in a datacenter has failed. The failed server is identified as server node 610. Unique identifier 611 of server node 610 is correlated with location 1 of appliance 600. Based on the correlation, the exact location of server node 610 is determined to be in location 1 (e.g., upper left hand side of appliance 600). As a result, once appliance 600 is located, an IT administrator or the like is able to readily identify the failed server as being the server node in location 1 (e.g., upper left hand side) of appliance 600.

Examples of Authentication and Configuration of an Appliance in a Network

Figure 7:
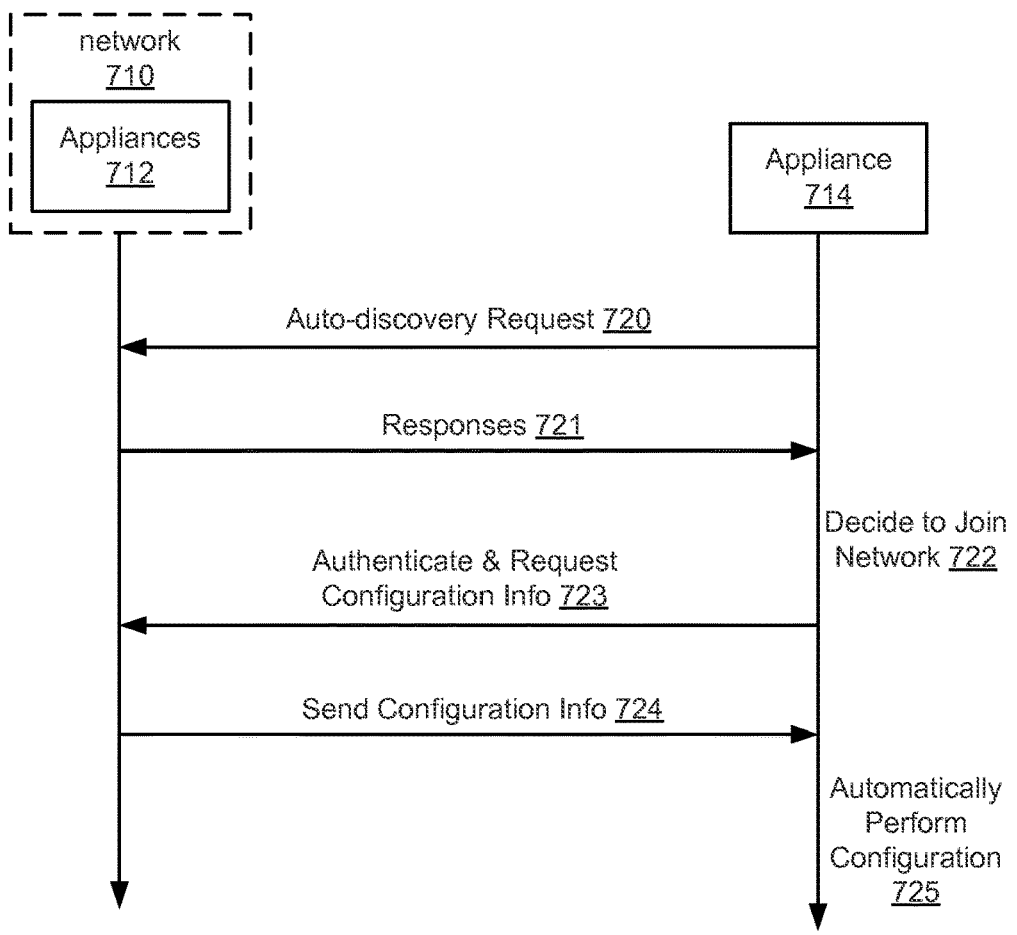
FIG. 7 depicts a flow diagram for a method for automatic network configuration of a pre-configured hyper-converged computing device, according to various embodiments.

FIG. 7 depicts a flow diagram 700 for a method for automatic configuration of an appliance. Network 710 includes appliances 712. Network 710 is similar to network 600, as described above. As such, appliances 1212 are similar to appliances in network 500. In particular, appliance 714 is similar to appliance 530 in that it is desired that appliance 714 is to be configured for network 710.

At 720, appliance 714 broadcasts an auto-discovery request to appliances 712 in network 710. The broadcast by appliance 714 is the same as the broadcast of appliance 530 described herein.

At 721, appliances 712 that receive the auto-discovery request provide responses to appliance 714. The responses are the same as responses 534 described herein.

At 722, it is decided that appliance 714 will join the network, either as a stand-alone appliance, joining an existing appliance cluster, or creating a new cluster with an existing stand-alone device.

At 723, appliance is authenticated with network 710 and appliance 714 requests network configuration information from appliances already configured in network 712. The configuration information can be any information the enables appliance 714 to be configured in network 710. For example, configuration information can be, but is not limited to, internet protocol (IP) addresses, virtual local area network identification (VLAN IDs), etc.

The authentication is any secured authentication protocol, such as an authentication that utilizes a shared key.

At 724, network configuration information is sent to appliance 714 from one or more appliances 712.

At 725, appliance 714 automatically performs the network configuration such that it is configured to be a part of network 710.

Examples of Reconfiguring an Appliance

Figure 8:
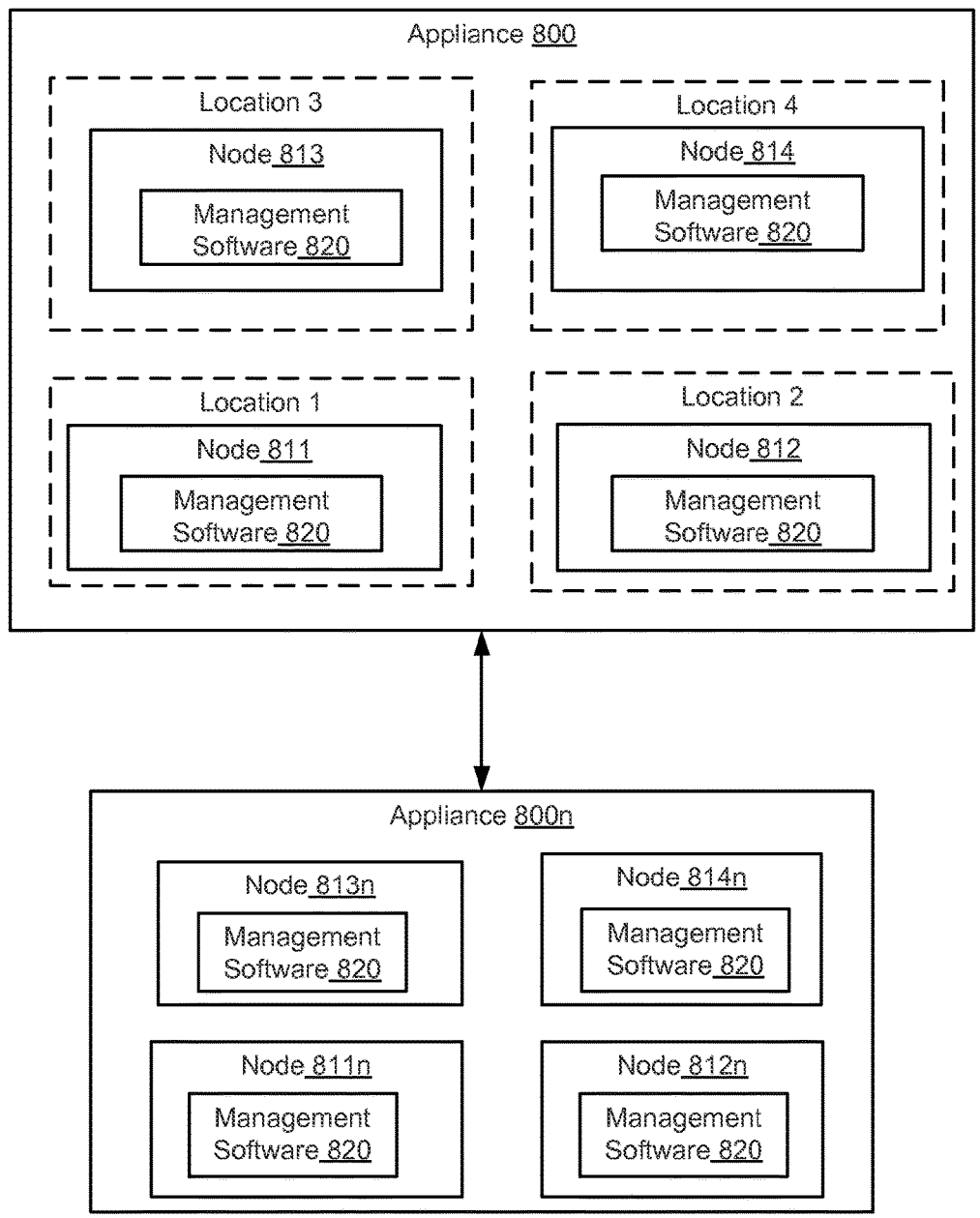
FIG. 8 depicts a block diagram of an appliance, according to various embodiments.

FIG. 8 depicts an embodiment of appliance 800. Appliance 800 is similar to other appliances described herein. Appliance 800 includes nodes 811, 812, 813 and 814 located at locations 1, 2, 3, and 4, respectively. As described herein, appliance 800, in various embodiments, may include additional nodes.

One of nodes 811, 812, 813 and 814 is designated as a primary or master node for appliance 800. The functions of the primary node are to manage and control appliance 800 and/or the virtual infrastructure that is supported by appliance 800.

In one embodiment, the independent server node at Location 1 is the default primary node. However, it should be appreciated that the nodes disposed in other Locations 2, 3 or 4 may be designated as the default primary node.

If node 811, at Location 1, is the designated primary node, then the other nodes in appliance 800 recognize node 811 as the primary node. As such, the non-primary nodes are managed and/or controlled by the primary node.

The management/control of appliance 800 is provided by management software 820 that is installed and executable on the default primary node (e.g., node 811). In particular, management software 820 is automatically executable upon the start-up or powering on of appliance 800.

Management software 820 may include a suite of software that supports virtualized computing (e.g., VMware vCenter™ Server Appliance) that utilizes various components such as a VMware ESX/ESXi hypervisor.

In one embodiment, management software 820 is pre-configured software module 320, as described herein. In another embodiment, management software 820 includes at least some portions of pre-configured software module 320.

Each node may include a copy or image of management software 820. For example, nodes 812, 813, and 814 have an image of management software 820 in storage. However, the image of management software 820 is not executable when primary node 811 is functioning and management software 820 is executable on primary node 811.

In various embodiments, the nodes of appliance 800 automatically register with one another upon powering on (or initialization) of appliance 800. If the designated primary node does not automatically register with the other nodes, then another registered node is automatically elected and reconfigured to be the new primary node.

The primary node may not be able to automatically register for various reasons. For example, the node may have a hardware and/or software error or failure. As a result, the primary node is unable to power-on or start up and management software 820 installed on the primary node is unable to execute.

In one example, when the appliance is powered on, the nodes automatically broadcast registration information/requests to one another. Upon expiration of a pre-determined time period (e.g., five minutes), if the primary node (e.g., node 811) has automatically registered with the other nodes, then the primary node (e.g., node 811) acts as the primary node as normal.

However, upon expiration of a pre-determined time period, if the primary node (e.g., node 811) does not automatically register with the other registered nodes (e.g., nodes 812, 813 and 814), then one of the other functioning and registered nodes is automatically elected and reconfigured as the new primary node. For example, the new primary node initializes and starts up the required management components to allow the operator to configure and use appliance 800 as normal. Additionally, the user or operator of appliance 800 is provided an alert that the default primary node has an error/failure.

Each node, in one embodiment, includes a daemon. Upon powering on of appliance 800, the daemon of each node automatically broadcasts registration information to one another such that each functioning node is aware of each other. It should be appreciated that, in one embodiment, a daemon from of the nodes enables method 700, as described above. For example, a daemon at least transmits auto-discovery request 732 and processes responses 721, as described above.

The newly elected primary node is automatically determined based on various parameters. In one embodiment, the newly elected node is the node furthest away from the non-registered primary node. For example, appliance 800 is dropped and the impact occurs near Location 1 such that primary node 811 experiences a hardware failure due to the drop. As a result, primary node 811 is not able to automatically register with the other nodes when appliance 800 is powered on.

Node 814 at Location 4 is the node furthest away from the Location 1 and the node that most likely did not incur any damage due to the impact from the drop. Therefore, node 814 at Location 4 is automatically elected and reconfigured as the new primary node to take the place of the non-functioning node 811.

The method to automatically determine a newly elected node may be recursively implemented. For example, if the initial primary node 811 at Location 1 fails, then node 814 at Location 4 is the first choice for election for the new primary node. However, if node 814 at Location 4 subsequently fails then another functioning node, such as node 813 at Location 3, is the newly elected primary node.

When a node is reconfigured to be the new primary node (e.g., node 814), the image of management software 820 that is stored on the new primary node is deployed, for example, by the daemon, such that the management software is able to execute on the new primary node (e.g., node 814). Additionally, the remaining functioning nodes (e.g., node 812 and 813) recognize the newly elected and reconfigured primary node.

In one embodiment, the management software is installed via a red hat package manager (RPM). For example, the image of the management software or portions thereof is installed on the new primary node by the daemon. The management software is then initialized and boots up such that it is executable on the new primary node.

If an updated version of the management software is available, then the installed management software on the primary node (e.g., primary node 811) is updated with the new version. Moreover, the images of the management software stored on the non-primary nodes (e.g., nodes 812, 813 and 814) are also updated with the new version of the management software. Accordingly, if one of the non-primary nodes is elected and reconfigured to be a new primary node, then the new primary node is installed with the new version of the management software.

In one embodiment, for an appliance to provide the sufficient resources for managing a virtualization infrastructure, at least three nodes in the appliance must be functioning. For example, upon powering on of appliance 800 and within the pre-determined time frame (e.g., five minutes) at least three of the four nodes of appliance 800 must automatically register within one another. If less than three nodes of appliance register with one another, then appliance 800 does not have the sufficient resources to support a virtualization infrastructure.

However, if appliance 800 is communicatively coupled with another appliance, such as appliance 800n, then nodes of appliance 800n may be utilized to meet the requirement of at least three functioning nodes. For example, if only two nodes (e.g., non-primary nodes 813 and 814) in appliance 800 are functional, then one of the functioning nodes (e.g., node 811n, 812n, 813n and 814n) of appliance 800n can account for a third functioning node.

Moreover, one of the functioning nodes of appliance 800n can be elected and reconfigured as a new primary node. For example, node 813*n* of appliance 800*n* can be elected and reconfigured to be a new primary node in a similar manner as described above.

Appliance 800, in various embodiments, may be reset. That is, appliance 800 may be reset such that it is automatically reconfigured to previous settings. For example, appliance 800 is pre-configured to default settings provided in the factory. As such, the settings are the initial settings upon the first powering on of appliance 800. Subsequent the first powering on of appliance 800, the initial settings are reconfigured to subsequent settings (e.g., reconfiguration provided by a user). In response to reset instructions by a user, appliance 800 is automatically reset to its original settings/configuration.

Example Methods of Reconfiguring an Appliance

Figure 10:
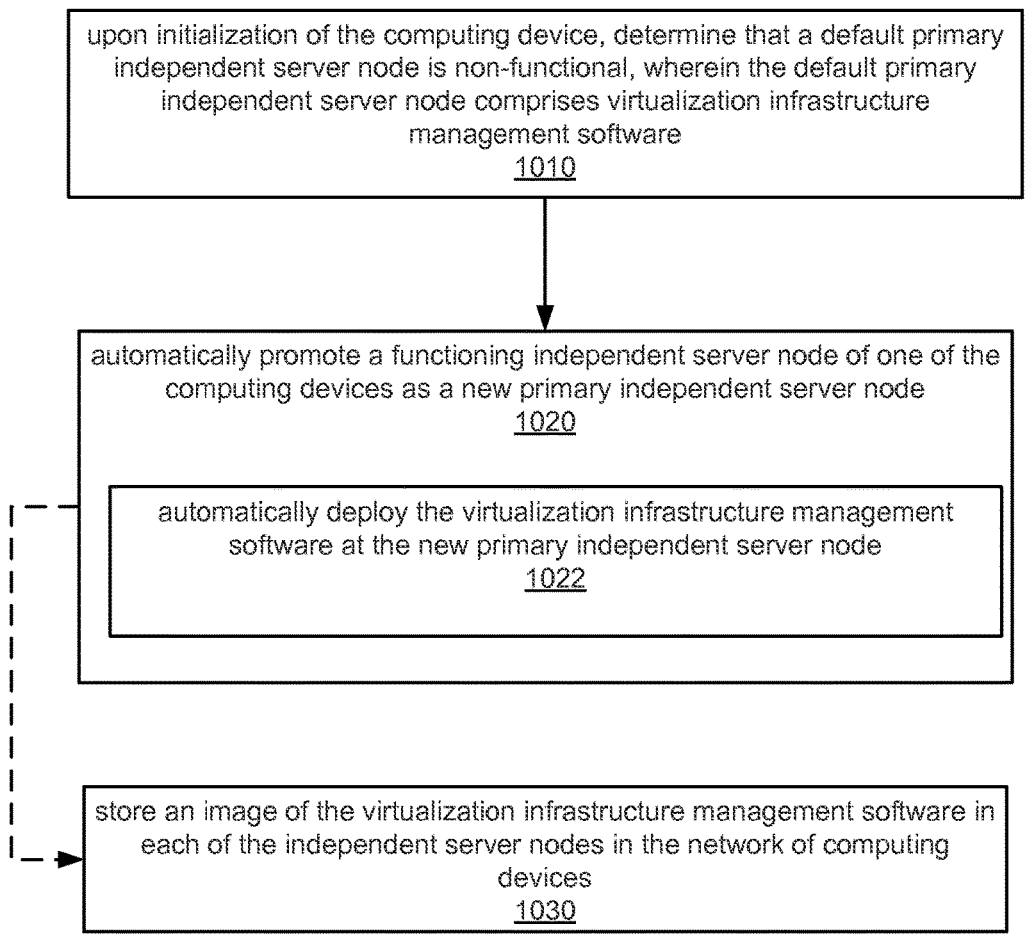
FIG. 10 depicts a flow diagram for automatic reconfiguration of a computing device in a network of computing devices for supporting a virtualization infrastructure, according to various embodiments.

The following discussion sets forth in detail the operation of some example methods of operation of embodiments. With reference to FIGS. 9, 10 and 11, flow diagrams 900, 1000 and 1100 illustrate example procedures used by various embodiments. Flow diagrams 900, 1000 and 1100 include some procedures that, in various embodiments, are carried out by a processor under the control of computer-readable and computer-executable instructions. In this fashion, procedures described herein and in conjunction with flow diagrams 900, 1000 and 1100 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 900, 1000 and 1100 such procedures are examples. That is, embodiments are well suited to performing various other procedures or variations of the procedures recited in flow diagrams 900, 1000 and 1100. Likewise, in some embodiments, the procedures in flow diagrams 900, 1000 and 1100 may be performed in an order different than presented and/or not all of the procedures described in one or more of these flow diagrams may be performed. It is further appreciated that procedures described in flow diagrams 900, 1000 and 1100 may be implemented in hardware, or a combination of hardware with firmware and/or software provided by an appliance (e.g., appliance 800).

FIG. 9 depicts a process flow diagram 900 of a method for automatic reconfiguration of a computing device for supporting a virtualization infrastructure, according to various embodiments.

At 910, upon initialization of the computing device, functioning independent server nodes of the independent server nodes are self-registered with one another, wherein one of the independent server nodes is a default primary independent server node comprising virtualization infrastructure management software. For example, appliance 800 is powered on for the first time. Independent server node 811 is the designated primary server node and is unable to self-register with the other nodes. Each of the functioning independent server nodes 812, 813 and 814 broadcast self-registration information to one another such that each of the functioning independent server nodes are known to one another.

At 920, in response to the default primary independent server node not self-registering with the functioning independent server nodes, one of the functioning independent server nodes is automatically reconfigured as a new primary independent server node. Independent server node 811 is unable to function properly, as such another functioning independent server node (e.g., node 812, node 813 or node 814) is automatically elected and reconfigured as the new primary independent server node.

At 922, the virtualization infrastructure management software is deployed at the new primary independent server node. For example, independent server node 812 is elected and reconfigured to be the new primary independent server node. Accordingly, the image of management software 820 stored on independent server node 812 is deployed onto independent server node 812 via a daemon such that management software 820 is executable on independent server node 812.

At 930, an image of the virtualization infrastructure management software is stored at each of the independent server nodes. For example, each independent server node on appliance 800 includes an image of management software 820. The image may be an initial image or may be an image of an updated version of the management software.

At 940, the reconfigured one of the functioning independent server nodes is automatically recognized as the new primary independent server node. For example, new primary independent server node 812 is recognized by the remaining functioning non-primary independent server nodes 813 and 814.

At 950, instructions are received at the new primary independent server node, from a user, for configuring the computing device via the new primary independent server node. For example, independent server node 812 is the new independent server node. As such, instructions to control/manage appliance 800 and/or the virtualization infrastructure supported by appliance 800 are received and implemented via the new primary independent server node 812.

It is noted that any of the procedures, stated above, regarding flow diagram 900 may be implemented in hardware, or a combination of hardware with firmware and/or software. For example, any of the procedures are implemented by a processor(s) of a cloud environment and/or a computing environment.

FIG. 10 depicts a process flow diagram 1000 of a method for automatic reconfiguration of a computing device in a network of computing devices for supporting a virtualization infrastructure, according to various embodiments.

At 1010, upon initialization of the computing device, determine that a default primary independent server node is non-functional, wherein the default primary independent server node comprises virtualization infrastructure management software. For example, appliance 800 and appliance 800*n* are grouped together in a network for supporting a virtualization infrastructure. Upon appliance 800 being powered on, it is determined that the default primary independent server node 811 of appliance is non-functioning and unable to self-register with the other functioning independent server nodes.

At 1020, a functioning independent server node of one of the computing devices is automatically promoted as a new primary independent server node. For example, independent server node 814 which is the furthest distance from the non-functioning default primary independent server node is automatically promoted as the new primary independent server node.

In another example, any of the functioning nodes of appliance 800n is automatically promoted as the new primary independent server node that is able to manage/control appliance 800, appliance 800n and/or the virtualization infrastructure supported at least by appliances 800 and 800n.

At 1022, automatically deploy the virtualization infrastructure management software at the new primary independent server node. For example, the image of the management software 820 stored at new primary independent server node 814 is deployed such that it executable at new primary independent server node 814.

At 1030, an image of the virtualization infrastructure management software is stored in each of the independent server nodes in the network of computing devices. For example, an image management software 820 is stored at each independent server node in appliance 800 and appliance 800n.

It is noted that any of the procedures, stated above, regarding flow diagram 1000 may be implemented in hardware, or a combination of hardware with firmware and/or software. For example, any of the procedures are implemented by a processor(s) of a cloud environment and/or a computing environment.

FIG. 11 depicts a process flow diagram 1100 of a method for resetting a pre-configured hyper-converged computing device for supporting a virtualization infrastructure, according to various embodiments.

At 1110, a plurality of independent server nodes of the pre-configured hyper-converged computing device for supporting a virtualization infrastructure is accessed, wherein the independent server nodes are configured from a first configuration to a second configuration. For example, appliance 800 includes initial pre-configured settings (e.g., factory settings) for each of the independent server nodes. The settings of appliance 800 are subsequently changed via user input.

At 1120, in response to user input, the plurality of independent server nodes are reset such that they are reconfigured from the second configuration to the first configuration. A user provides a single instruction to reset appliance 800. As a result, appliance 800 is reset to its initial pre-configured settings (e.g., factory settings).

It is noted that any of the procedures, stated above, regarding flow diagram 1100 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What we claim is:

1. A computer-implemented method for automatic reconfiguration of a computing device, including requisite physical hardware and software, for supporting a virtualization infrastructure, wherein said computing device comprises independent physical server nodes, each of said independent physical server nodes disposed at a designated location within said computing device, said method comprising:

upon initialization of said computing device, including said requisite physical hardware and said software for supporting said virtualization infrastructure, self-registering functioning independent physical server nodes of said independent physical server nodes with one another, wherein one of said independent physical server nodes is a default primary independent physical server node physically located within said computing device, wherein each of said independent physical server nodes is isolated from one another and independent of one another, and wherein said computing device does not include a backplane such that said independent physical server nodes are isolated from another and independent of one another within said computing device, and comprising virtualization infrastructure management software, wherein said computing device comprises a pre-configured hyper-converged computing device, said pre-configured hyper-converged computing device further comprising:

pretested, pre-configured and pre-integrated storage, server and network components, including software, that are located in an enclosure; and a hypervisor that supports a virtualization infrastructure; and in response to said default primary independent physical server node being non-functional and not self-registering with said functioning independent physical server nodes, automatically reconfiguring one of said functioning independent physical server nodes as a new primary independent physical server node.

2. The computer-implemented method of claim 1, further comprising:

storing an image of said virtualization infrastructure management software in each of said independent physical server nodes.

3. The computer-implemented method of claim 1, wherein said new primary independent physical server node is one of said functioning independent physical server nodes that is the furthest distance, within said computing device, from said default primary independent physical server node.

4. The computer-implemented method of claim 1, wherein said new primary independent physical server node is one of said functioning independent physical server nodes that is the furthest distance horizontally and vertically, within said computing device, from said default primary independent physical server node.

5. The computer-implemented method of claim 1, wherein said automatically reconfiguring one of said functioning independent physical server nodes as a new primary independent physical server node further comprises:

deploying said virtualization infrastructure management software to said new primary independent physical server node.

6. The computer-implemented method of claim 1, wherein said new primary independent physical server node is reconfigured in response to said default primary independent physical server node not self-registering within a predetermined amount of time.

7. The computer-implemented method of claim 1, further comprising:

automatically recognizing said reconfigured one of said functioning independent physical server nodes as said new primary independent physical server node.

8. The computer-implemented method of claim 1, further comprising:

receiving instructions, at said new primary independent physical server node, from a user, for configuring said computing device via said new primary independent physical server node.

9. The computer-implemented method of claim 1, wherein said computing device is a two rack unit-four node (2U/4N) device.

* * * * *